United States Patent
Kanbe et al.

(10) Patent No.: US 6,340,511 B1
(45) Date of Patent: Jan. 22, 2002

(54) FUEL HOSE

(75) Inventors: Shinobu Kanbe; Masashi Kondo, both of Komaki; Motohide Nishimura, Kasugai, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/428,060

(22) Filed: Oct. 27, 1999

(51) Int. Cl.[7] .................. B29D 23/24; B32B 1/08; F16L 11/06
(52) U.S. Cl. ............... 428/36.91; 138/137; 138/138; 428/421; 428/422
(58) Field of Search ............... 428/36.91, 421, 428/422; 138/137, 138

(56) References Cited

U.S. PATENT DOCUMENTS

| | | | | |
|---|---|---|---|---|
| 5,218,026 A | * | 6/1993 | Toda et al. | 525/255 |
| 5,588,469 A | | 12/1996 | Kakiuchi et al. | 138/137 |
| 5,639,528 A | * | 6/1997 | Feit et al. | 428/36.91 |

FOREIGN PATENT DOCUMENTS

| | | | | |
|---|---|---|---|---|
| EP | 0 739 712 | | 10/1996 | |
| JP | 85033662 B | * | 9/1983 | |
| JP | B-60-33662 | | 3/1985 | ........... F16L/11/04 |
| JP | B-60-33663 | | 3/1985 | ........... F16L/11/04 |
| JP | 60235864 | | 11/1985 | |
| JP | 03153749 A | * | 7/1991 | |
| JP | A-7-229584 | | 8/1995 | ........... F16L/11/04 |
| JP | 08294979 | | 11/1996 | |
| JP | A-9-196247 | | 7/1997 | ........... F16L/11/05 |
| JP | A-10-54485 | | 2/1998 | ........... F16L/11/10 |

* cited by examiner

*Primary Examiner*—Harold Pyon
*Assistant Examiner*—Sandra M. Nolan
(74) *Attorney, Agent, or Firm*—Jacobson Holman, PLLC

(57) ABSTRACT

A fuel hose comprising an inner layer formed of FKM and an outer layer formed of an NBR.PVC blend that are adhered well by vulcanization and having an excellent resistance to gasoline and an excellent weatherability, wherein the polymerization degree and the amount of PVC in the blend are specified in fixed ranges a carboxylic acid 1,8-diazabicyclo(5,4,0)-undecene-7 salt is incorporated in the NBR.PVC blend, and a polyol-type vulcanizing agent is incorporated in the FKM.

20 Claims, No Drawings

FUEL HOSE

BACKGROUND OF THE INVENTION

1. Field of the Invention

The present invention relates to a fuel hose used in a fuel piping within an engine room of automobiles. More specifically, the invention relates to a fuel hose in which an inner layer is formed of a fluororubber (FKM), an outer layer is formed of a blend (NBR.PVC) of an acrylonitrile-butadiene rubber (NBR) and polyvinyl chloride (PVC), and the inner and outer layers are adhered well by vulcanization.

2. Description of the Related Art

As such a fuel hose, a monolayered hose formed of an NBR.PVC blend with a weatherability is well known in which it is intended to improve a resistance to gasoline and an impermeability to gasoline with NBR and a resistance to ozone with PVC.

However, regarding the strict regulations to permeability to gasoline in recent years, only the monolayered hose is insufficient. The use of FKM which is excellent in the resistance to gasoline or the impermeability to gasoline has been also proposed, but FKM is costly.

Accordingly, an FKM/NBR.PVC fuel hose in which FKM is used in an inner layer and NBR.PVC that is less costly and is good in the resistance to gasoline, the impermeability to gasoline and the resistance to ozone is used in an outer layer is considered to be optimal. In this case, however, it is required that the inner and outer layers are adhered through simple adhesion by vulcanization so strongly as to satisfactorily prevent peeling-off therebetween. Thus, the method of adhesion by vulcanization becomes a problem.

JP-B-60-33663 describes a technique in which, when an inner layer is formed of FKM and an outer layer of an epichlorohydrin (ECO) rubber, the adhesion by vulcanization is enhanced by incorporating a carboxylic acid 1,8-diazabicyclo-(5,4,0)-undecene-7 salt (carboxylic acid DBU salt). JP-B-60-33662 describes that for adhesion between FKM and NBR a carboxylic acid DBU salt is incorporated in FKM or NBR and a basic silica-type filler and an epoxy compound are incorporated in NBR. However, JP-B-60-33663 only describes an adhesion recipe of FKM and ECO, and JP-B-60-33662 an adhesion recipe of FKM and NBR. A desirable recipe of adhesion by vulcanization of FKM and NBR.PVC is not suggested therein.

In JP-A-10-54485, an FKM/NBR.PVC fuel hose is briefly indicated in the description of the prior art, but the adhesion between the inner and outer layers and the recipe of adhesion by vulcanization thereof are not disclosed at all.

JP-A-9-196247 describes that a carboxylic acid DBU salt is incorporated in NBR.PVC to improve the adhesion with a material to be adhered. However, the material to be adhered is not FKM but a fluororesin. Besides, after vulcanization of NBR.PVC, a fluororesin is melt-adhered. Thus, it does not teach the adhesion by vulcanization between FKM and NBR.PVC.

JP-A-7-229584 is an invention concerning adjustment of a thickness ratio of inner and outer layers of an FKM/NBR.PVC fuel hose. With respect to the recipe of adhesion by vulcanization, it is described that a carboxylic acid DBU salt is added and a polyol vulcanizing agent is employed. However, owing to special circumstances that FKM is inherently poor in the adhesion with other rubber materials and it is all the more difficult to secure an adhesion strength with FKM by adding PVC for imparting a resistance to ozone to NBR, only the recipe of adhesion by vulcanization is not necessarily satisfactory to realize the good adhesion by vulcanization between FKM and NBR.PVC.

SUMMARY OF THE INVENTION

It is an object of the invention that a desirable recipe of adhesion by vulcanization between FKM and NBR.PVC is specifically worked out and thereby a fuel hose is realized in which FKM as an inner layer is firmly adhered to an NBR.PVC blend as an outer layer.

The object of the invention is achieved by a fuel hose (FKM/NBR.PVC) comprising an inner layer formed of a fluororubber (FKM) and an outer layer formed of a blend (NBR.PVC) of an acrylonitrile-butadiene rubber (NBR) and polyvinyl chloride (PVC) and adhered to the inner layer by vulcanization, wherein polyvinyl chloride having an average polymerization degree of from 700 to 1,750 amounts to from 15 to 45 parts by weight per 100 parts by weight of the blend, a carboxylic acid 1,8-diazabicyclo-(5,4,0)-undecene-7 salt (carboxylic acid DBU salt) represented by formula (1)

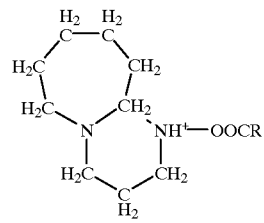

(1)

, wherein R denotes a saturated or unsaturated hydrocarbon radical having a chain structure and/or a cyclic structure, or a derivative thereof, and the structure may contain atoms other than carbon atoms and hydrogen atoms, is incorporated in the blend, and a polyol vulcanizing agent is incorporated in the fluororubber.

In the invention having this construction, since PVC having the average polymerization degree of from 700 to 1,750 is used in the NBR.PVC blend, the vulcanizing adhesion with FKM is good. Since the lower limit of PVC in the blend is 15 parts by weight per 100 parts by weight of the blend, the resistance to ozone of the outer layer in the fuel hose is secured. Further, since the upper limit of PVC is 45 parts by weight, the adhesion strength of the blend to FKM is also good.

Further, since the carboxylic acid DBU salt is incorporated in the blend, the blend and FKM are firmly adhered by vulcanization. Still further, since the polyol vulcanizing agent is incorporated in FKM, the adhesion between the blend and FKM is all the more improved.

In the invention, the fuel hose is obtained in which these effects are exhibited synergistically, so that a satisfactory resistance to gasoline or impermeability to gasoline and the resistance to ozone are consistent and the inner and outer layers are hardly peeled off owing to the good vulcanizing adhesion between the FKM layer and the NBR.PVC layer.

The above and other objects, features and advantages of the invention will become more apparent from the following description.

DETAILED DESCRIPTION

The invention is described in more detail below by referring to more concrete examples.

The fuel hose of the invention refers to a hose mainly used in a fuel piping within an engine room of automobiles. This fuel hose also includes those used in products other than automobiles. Further, it includes, besides the fuel hose comprising the inner layer formed of FKM and the outer layer formed of the NBR.PVC blend, a fuel hose in which an inner tube is formed of these inner and outer layers and an outer tube formed of an appropriate material is mounted on the outside of the inner tube.

FKM can be selected, as required, from materials used in this sort of use without limitation. For example, a vinylidene fluoride-hexafluoropropylene copolymer and a vinylidene fluoride-hexafluoropropylene-tetrafluoroethylene tertiary copolymer are preferable. The latter is especially excellent in the resistance to gasoline.

The polyol vulcanizing agent is incorporated in FKM to improve the difficulty in the adhesion by vulcanization inherent in FKM. Further, in addition to the polyol vulcanizing agent, an organic peroxide as a peroxide vulcanizing agent and a polyfunctional unsaturated compound are incorporated to be able to provide a stronger vulcanizing adhesion to NBR.PVC. The incorporation of only the peroxide vulcanizing agent without the addition of the polyol vulcanizing agent is relatively poor in the adhesion.

The polyol vulcanizing agent comprises (a) a polyhydroxy aromatic compound as a crosslinking agent, (b) at least one compound selected from an ammonium salt, a phosphonium salt and an iminium salt as a vulcanization accelerator and (c) at least one compound selected from a divalent metal oxide and a divalent metal hydroxide as an acid acceptor.

The component (a) can be used in an amount of from 0.1 to 10 parts by weight, preferably from 0.6 to 5 parts by weight per 100 parts by weight of FKM, the component (b) in an amount of from 0.05 to 5 parts by weight, more preferably from 0.1 to 3 parts by weight per 100 parts by weight of FKM, and the component (c) in an amount of from 1 to 30 parts by weight, preferably from 2 to 10 parts by weight per 100 parts by weight of FKM, respectively. When the amounts are more than these ranges, there are disadvantages that no satisfactory tensile elongation is obtained, scorching tends to occur and a processed surface is poor. When the amounts are less than these ranges, there are disadvantages that the adhesion with NBR.PVC is decreased and no satisfactory tensile strength is obtained.

Examples of the polyhydroxy aromatic compound include hydroquinone, 2,2-bis (4-hydroxyphenyl) propane (bisphenol A), 2,2-bis (4-hydroxyphenyl)perfluoropropane (bisphenol AF), 4,4'-dihydroxydiphenylmethane and 2,2-bis (4-hydroxyphenyl) butane. These can be used either singly or in combination.

Examples of the ammonium salt, the phosphonium salt and the iminium salt include tetramethylammonium chloride, tetraethylammonium chloride, tetrapropylammonium chloride, tetrabutylammonium chloride, tetrabutylammonium bromide, bis(benzylphenylphosphine)iminium chloride, tetrabutylphosphonium chloride, benzyltriphenylphosphonium chloride and benzyltrioctylphosphonium chloride. These can be used either singly or in combination.

Examples of the divalent metal oxide and the divalent metal hydroxide include oxides and hydroxides of Mg, Ca, Zn and Pb. These can be used either singly or in combination. Further, in order to increase the effect of the vulcanization accelerator, various vulcanization accelerators typified by sulfone compounds such as dimethylsulfone and dichlorodiphenylsulfone can be added, as required.

The organic peroxide is not particularly limited. Preferable examples thereof include 2,5-dimethyl-2,5-di(t-butylperoxy)hexine-3 and 2,5-dimethyl-2,5-di(t-butylperoxy)hexane. These can be used either singly or in combination in an amount of from 0.05 to 5 parts by weight, preferably from 0.1 to 2 parts by weight per 100 parts by weight of FKM in consideration of an amount of active oxygen or a decomposition temperature.

The polyfunctional unsaturated compound is used to effectively conduct the crosslinking reaction, and its type is not particularly limited. Examples thereof include triallyl isocyanurate, tris (diallylamine)-S-triazine and triallyl cyanurate. Of these, triallyl cyanurate is especially preferable. These can be used either singly or in combination in an amount of from 0.01 to 10 parts by weight, preferably from 0.1 to 3 parts by weight per 100 parts by weight of FKM.

As the vulcanizing agent which is incorporated in FKM of the invention, a combination of the polyol vulcanizing agent and the peroxide vulcanizing agent is preferable in view of the good vulcanizing adhesion with NBR.RVC.

FKM of the invention may contain various additives as required. Examples of the additives include reinforcing agents such as carbon black, silica, clay and talc, and processing aids such as waxes and a silicone rubber powder.

With respect to NBR and PVC constituting the NBR.PVC blend, those which are employed in this sort of use can optionally be selected without limitation on and blended as required.

It is preferable that PVC used in the NBR.PVC blend has an average polymerization degree of from 700 to 1,750 and its amount is between 15 and 45 parts by weight per 100 parts by weight of the blend. When the average polymerization degree of PVC exceeds 1,750, there are disadvantages that, since the melt viscosity of the blend in the formation of the hose and the vulcanization is increased, PVC is hard to adhere to FKM and the vulcanizing adhesion strength is consequently decreased. Further, when the amount of PVC is less than 15 parts by weight, the resistance to ozone of NBR.PVC constituting the outer layer is insufficient. When it exceeds 45 parts by weight, the properties of NBR.PVC become closer to those of the resin to decrease the adhesion strength thereof and decrease the adhesion strength with FKM constituting the inner layer.

The content of bound acrylonitrile in NBR of the NBR.PVC blend is preferably between 28 and 42% by weight. When it is less than 28% by weight, the resistance to gasoline of NBR.PVC is insufficient. When it exceeds 42% by weight, the adhesion strength of NBR.PVC to FKM is poor.

In order to further enhance the adhesion of NBR.PVC as the outer layer to FKM constituting the inner layer, at least one material selected from a metal oxide, a silica-type filler and an epoxy resin can be incorporated in NBR.PVC. For improving the adhesion, a combined use of a metal oxide and an epoxy resin is preferable.

Examples of the metal oxide include MgO, PbO and aluminum oxide. Of these, MgO is especially preferable. The amount thereof is preferably between 1 and 20 parts by weight per 100 parts by weight of NBR.PVC.

Examples of the silica-type filler include acid silica (for example, "NIPSIL", pH approximately 6) and basic silica (f or example, "CARPLEX", pH approximately 11). Of these, basic silica is preferable . The amount of the filler is preferably between 5 and 50 parts by weight per 100 parts by weight of NBR.PVC.

The epoxy resin also includes a thermoplastic resin having two or more epoxy groups in the molecule. A resin obtained by the reaction of bisphenol A and epichlorohydrin is preferably used. The amount thereof is preferably at least an effective amount and at most approximately 15 parts by weight per 100 parts by weight of NBR.PVC.

The NBR.PVC blend may contain a plasticizer. The amount thereof is preferably at least an effective amount and at most approximately 30 parts by weight per 100 parts by weight of NBR.PVC. For the adhesion, the amount is preferably at most 25 parts by weight. When the amount of the plasticizer exceeds 30 parts by weight, it is feared that the vulcanizing adhesion to FKM might be insufficient. As the plasticizer, an ether ester-type plasticizer represented by formula (2)

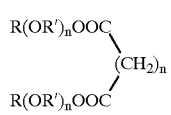

(2)

, wherein R denotes an alkyl radical and R' an alkylene radical, is preferable. Dibutyl carbitol adipate is especially preferable. Further, a phthalic acid ester such as DOP is preferably used as the plasticizer.

FKM of the invention may contain a vulcanizing agent, a vulcanization accelerator, an antioxidant and a filler such as carbon black which are known, as required.

[Carboxylic Acid DBU Salt]

The carboxylic acid DBU salt is incorporated in the NBR.PVC blend and/or the fluororubber. It is especially preferable to incorporate the same in the NBR.PVC blend. Typical examples of the carboxylic acid in the carboxylic acid DBU salt include naphthoic acid, 2-hydroxynaphthoic acid, sorbic acid, 2-ethylhexylnaphthoic acid, gallic acid, p-hydroxybenzoic acid and cinnamic acid. Naphthoic acid DBU salt and sorbic acid DBU salt are especially preferable.

The incorporation amount of the carboxylic acid DBU salt is between 0.1 and 4 parts by weight, preferably between 0.5 and 3 parts by weight per 100 parts by weight of NBR.PVC and/or the fluororubber. When this amount is too small, the vulcanizing adhesion between FKM and NBR.PVC cannot satisfactorily be enhanced. When this amount is too large, the adhesion strength is satisfactory, but the resistance to ozone and the cold resistance are decreased.

EMBODIMENTS

Peel Test Using Test Pieces

A test piece obtained by adhering FKM and NBR.PVC by vulcanization was subjected to a peel test.

First, FKM was kneaded with an open roll according to each of the recipes A, B and C in Table 1. In Table 1, the amount is expressed in terms of parts by weight. "FKM-1" denotes a vinylidene fluoride-hexafluoropropylene tetrafluoroethylene tertiary copolymer in which the fluorine content is 69% by weight. It contains a polyol vulcanizing agent, and vulcanization with a peroxide is also possible. Further, "FKM-2" denotes a vinylidene fluoride-hexafluoropropylene tetrafluoroethylene tertiary copolymer in which the fluorine content is 69% by weight. It is a type of vulcanization with a peroxide. "TAIC" denotes triallyl isocyanurate. Further "peroxide" denotes 2,5-dimethyl-2,6 (t-butylperoxy)hexane, an organic peroxide.

TABLE 1

|  | A | B | C |
|---|---|---|---|
| FKM-1 | 100 | 100 | — |
| FKM-2 | — | — | 100 |
| magnesium oxide | 3 | 3 | 10 |
| calcium hydroxide | 6 | 6 | — |
| carbon black | 30 | 30 | 30 |
| TAIC | — | 2 | 2 |
| peroxide | — | 1.5 | 1.5 |

Further, NBR.PVC was kneaded with a Banbury mixer and an open roll according to each of the recipes a to y in Tables 2 and 3. In Tables 2 and 3, "NBR.PVC-1" denotes a blend in which an NBR:PVC blend ratio (hereinafter simply referred to as a "blend ratio") is 70:30, a bound acrylonitrile content (hereinafter simply referred to as an "AN content") of NBR is 35% by weight and an average polymerization degree (hereinafter simply referred to as a "polymerization degree") of PVC is 800. Further, "NBR.PVC-2" denotes a blend in which a blend ratio is 70:30, an AN content is 35% by weight and a polymerization degree is 1,650; "NBR.PVC-3" a blend in which a blend ratio is 80:20, an AN content is 35% by weight and a polymerization degree is 800; "NBR.PVC-4" a blend in which a blend ratio is 80:20, an AN content is 35% by weight and a polymerization degree is 1,650; "NBR.PVC-5" a blend in which a blend ratio is 70:30, an AN content is 35% by weight and a polymerization degree is 500; "NBR.PVC-6" a blend in which a blend ratio is 70:30, an AN content is 35% by weight and a polymerization degree is 2,000; "NBR.PVC-7" a blend in which a blend ratio is 90:10, an AN content is 35% by weight and a polymerization degree is 800; "NBR.PVC-8" a blend in which a blend ratio is 50:50, an AN content is 35% by weight and a polymerization degree is 800; "NBR.PVC-9" a blend in which a blend ratio is 70:30, an AN content is 29% by weight and a polymerization degree is 800; "NBR.PVC-10" a blend in which a blend ratio is 70:30, an AN content is 41% by weight and a polymerization degree is 800; "NBR.PVC-11" a blend in which a blend ratio is 70:30, an AN content is 45% by weight and a polymerization degree is 800.

In Tables 2 and 3, "NIPSIL VN3" is a trade name for a silica-type filler, pH 6, made by Nippon Silica Kogyo. "CARPLEX 1120" is a trade name for a silica-type filler, pH 11, made by Shionogi & Co., Ltd. "EPON RESIN 828" is a trade name for an epoxy resin made by Shell Kagaku. "ADK CIZER RS-107" is a trade name for an ether ester-type plasticizer made by Asahi Denka Kogyo K.K.

TABLE 2

|  | a | b | c | d | e | f | g | h | i | j | k | l |
|---|---|---|---|---|---|---|---|---|---|---|---|---|
| NBR.PVC-1 | 100 | 100 | 100 | 100 | 100 | 100 | 100 | 100 | 100 | 100 | 100 | 100 |
| stearic acid | 1 | 1 | 1 | 1 | 1 | 1 | 1 | 1 | 1 | 1 | 1 | 1 |
| zinc oxide | 10 | 10 | 10 | 10 | 10 | 10 | 10 | 10 | 10 | 10 | 10 | 10 |
| magnesium oxide | — | — | 10 | — | 10 | 10 | 10 | 10 | 10 | 10 | 10 | 10 |
| antioxidant | 2 | 2 | 2 | 2 | 2 | 2 | 2 | 2 | 2 | 2 | 2 | 2 |
| carbon black | 40 | 40 | 40 | 40 | 40 | 40 | 40 | 40 | 40 | 40 | 40 | 40 |
| NIPSIL VN3 | — | — | — | — | — | 20 | — | — | — | — | — | — |
| CARPLEX 1120 | — | — | — | — | — | — | 20 | 20 | 20 | 20 | 20 | 20 |
| EPON RESIN 828 | — | — | — | 10 | 10 | 10 | 10 | 10 | 10 | 10 | 10 | 10 |
| naphthoic acid DBU salt | — | 2 | 2 | 2 | 2 | 2 | 2 | — | 2 | 2 | 2 | 2 |
| sorbic acid DBU salt | — | — | — | — | — | — | — | 2 | — | — | — | — |
| ADK CIZER RS-107 | 15 | 15 | 15 | 15 | 15 | 15 | 15 | 15 | 25 | 30 | 40 | — |
| DOP | — | — | — | — | — | — | — | — | — | — | — | 15 |
| crosslinking agent | 6 | 6 | 6 | 6 | 6 | 6 | 6 | 6 | 6 | 6 | 6 | 6 |

TABLE 3

|  | m | n | o | p | q | r | s | t | u | v | x | y |
|---|---|---|---|---|---|---|---|---|---|---|---|---|
| NBR.PVC-1 | 100 | 100 | — | — | — | — | — | — | — | — | — | — |
| NBR.PVC-2 | — | — | 100 | — | — | — | — | — | — | — | — | — |
| NBR.PVC-3 | — | — | — | 100 | — | — | — | — | — | — | — | — |
| NBR.PVC-4 | — | — | — | — | 100 | — | — | — | — | — | — | — |
| NBR.PVC-5 | — | — | — | — | — | 100 | — | — | — | — | — | — |
| NBR.PVC-6 | — | — | — | — | — | — | 100 | — | — | — | — | — |
| NBR.PVC-7 | — | — | — | — | — | — | — | 100 | — | — | — | — |
| NBR.PVC-8 | — | — | — | — | — | — | — | — | 100 | — | — | — |
| NBR.PVC-9 | — | — | — | — | — | — | — | — | — | 100 | — | — |
| NBR.PVC-10 | — | — | — | — | — | — | — | — | — | — | 100 | — |
| NBR.PVC-11 | — | — | — | — | — | — | — | — | — | — | — | 100 |
| stearic acid | 1 | 1 | 1 | 1 | 1 | 1 | 1 | 1 | 1 | 1 | 1 | 1 |
| zinc oxide | 10 | 10 | 10 | 10 | 10 | 10 | 10 | 10 | 10 | 10 | 10 | 10 |
| magnesium oxide | 10 | 10 | 10 | 10 | 10 | 10 | 10 | 10 | 10 | 10 | 10 | 10 |
| antioxidant | 2 | 2 | 2 | 2 | 2 | 2 | 2 | 2 | 2 | 2 | 2 | 2 |
| carbon black | 40 | 40 | 40 | 40 | 40 | 40 | 40 | 40 | 40 | 40 | 40 | 40 |
| CARPLEX 1120 | 20 | 20 | 20 | 20 | 20 | 20 | 20 | 20 | 20 | 20 | 20 | 20 |
| EPON RESIN 828 | 10 | 10 | 10 | 10 | 10 | 10 | 10 | 10 | 10 | 10 | 10 | 10 |
| naphthoic acid DBU salt | 3.5 | 5 | 2 | 2 | 2 | 2 | 2 | 2 | 2 | 2 | 2 | 2 |
| ADK CIZER RS-107 | 15 | 15 | 15 | 15 | 15 | 15 | 15 | 15 | 15 | 15 | 15 | 15 |
| crosslinking agent | 6 | 6 | 6 | 6 | 6 | 6 | 6 | 6 | 6 | 6 | 6 | 6 |

The 2-millimeter-thick sheet of FKM in each of A to C in Table 1 and the 2-millimeter-thick sheet of NBR.PVC sheet in each of a to y in Tables 2 and 3 which were in the kneaded, unvulcanized state were laminated with each other in the combination shown in each of Examples 1 to 32 and Comparative Examples 1 to 16 in Table 4. Each of the laminates was first prepressed at 100° C. and a surface pressure of 20 kgf/cm² for 5 minutes, and then steam-vulcanized with a steam vulcanizer at 160° C. for 45 minutes. Then, the resulting product was cut to a width of 25 mm, and subjected to the T-peel test according to JIS K 6256.

The test results are shown in Table 4. "Adhesion state" refers to visual observation of an adhesion state between the FKM sheet and the NBR.PVC sheet. "Rubber destroyed" means that the rubber is destroyed throughout the peel surfaces of both sheets. "Interfacial peeling" means that the whole surface is in the interfacial peeling. "Rubber/partially destroyed" means that the rubber destroyed portion and the interfacial peeling portion coexist. The mark * means that the rubber sheet is broken in the peel test.

TABLE 4

| | Combination of materials | | Peel strength (N/25 mm) | Adhesion state |
|---|---|---|---|---|
| | FKM | NBR•PVC | | |
| Example No. | | | | |
| 1 | A | b | 48 | Rubber/partially destroyed |
| 2 | A | c | 51 | Rubber/partially destroyed |
| 3 | A | d | 55 | Rubber/partially destroyed |
| 4 | A | e | 75 | Rubber destroyed |
| 5 | A | f | 81 | Rubber destroyed |
| 6 | A | g | 95 | Rubber destroyed |
| 7 | A | h | 84 | Rubber destroyed |
| 8 | A | i | 80 | Rubber destroyed |
| 9 | A | j | 59 | Rubber destroyed |
| 10 | A | l | 61 | Rubber destroyed |
| 11 | A | m | 125 | Rubber destroyed |
| 12 | A | o | 80 | Rubber destroyed |
| 13 | A | p | 111 | Rubber destroyed |
| 14 | A | q | 90 | Rubber destroyed |
| 15 | A | v | 85 | Rubber destroyed |
| 16 | A | x | 52 | Rubber/partially destroyed |
| 17 | B | b | 54 | Rubber/partially destroyed |
| 18 | B | c | 59 | Rubber/partially destroyed |
| 19 | B | d | 60 | Rubber/partially destroyed |
| 20 | B | e | 79 | Rubber destroyed |
| 21 | B | f | 90 | Rubber destroyed |
| 22 | B | g | 120 | Rubber destroyed |
| 23 | B | h | 100 | Rubber destroyed |
| 24 | B | i | 90 | Rubber destroyed |
| 25 | B | j | 68 | Rubber/partially destroyed |
| 26 | B | l | 69 | Rubber/partially destroyed |
| 27 | B | m | 128 | Rubber destroyed |
| 28 | B | o | 108 | Rubber destroyed |
| 29 | B | p | 122 | Rubber destroyed |
| 30 | B | q | 113 | Rubber destroyed |
| 31 | B | v | 105 | Rubber destroyed |
| 32 | B | x | 60 | Rubber/partially destroyed |
| Comparative Example No. | | | | |
| 1 | A | a | 2 | Interfacial peeling |
| 2 | B | a | 2 | Interfacial peeling |
| 3 | C | a | 1 | Interfacial peeling |
| 4 | C | g | 35 | Interfacial peeling |
| 5 | A | k | 28 | Interfacial peeling |
| 6 | A | r | 120 | Rubber destroyed |
| 7 | A | s | 32 | Interfacial peeling |
| 8 | A | t | 130<* | Rubber destroyed |

TABLE 4-continued

| | Combination of materials | | Peel strength (N/25 mm) | Adhesion state |
|---|---|---|---|---|
| | FKM | NBR•PVC | | |
| 9 | A | u | 20 | Interfacial peeling |
| 10 | B | k | 36 | Interfacial peeling |
| 11 | B | n | 130 | Rubber destroyed |
| 12 | B | r | 130<* | Rubber destroyed |
| 13 | B | s | 37 | Interfacial peeling |
| 14 | B | t | 130<* | Rubber destroyed |
| 15 | B | u | 37 | Interfacial peeling |
| 16 | B | y | 35 | Interfacial peeling |

Test of Physical Properties Using Test Pieces

A test of ordinary physical properties and an ozone degradation test were conducted using vulcanized test pieces of NBR.PVC.

First, NBR.PVC was kneaded with a Banbury mixer and an open roll according to the predetermined recipes of a to y in Tables 2 and 3 as shown in Table 5. The resulting sheets were indicated as Examples 33 to 48 and Comparative Examples 17–19.

Subsequently, these kneaded, unvulcanized sheets 2 mm in thickness were prepressed at 100° C. and a surface pressure of 20 kgf/cm$^2$ for 5 minutes, and steam-vulcanized with a steam vulcanizer at 160° C. for 45 minutes. The vulcanized products were subjected to tests of ordinary physical properties (TB, EB, HS) according to JIS K 6251. Further, an ozone degradation test was conducted according to JIS K 6259. The conditions of the ozone degradation test were that a temperature was 40° C., an ozone concentration was 50 pphm and an elongation rate was 20%. The test results are shown in Table 5.

The results of Table 5 reveal that Examples 33 to 48 are normal and good in the resistance to ozone degradation. Meanwhile, in Comparative Examples 17 to 19, the resistance to ozone degradation is evaluated as "A-3" or "B-3", and insufficient and thus, these are inappropriate as an outer layer material of a fuel hose.

TABLE 5

| | | Ex. 33 | Ex. 34 | Ex. 35 | Ex. 36 | Ex. 37 | Ex. 38 | Ex. 39 |
|---|---|---|---|---|---|---|---|---|
| | NBR.PVC | b | c | d | e | f | g | h |
| Ordinary properties | TB [Mpa] | 13.5 | 15 | 12.2 | 13.8 | 14.8 | 14.5 | 12.8 |
| | EB [%] | 460 | 410 | 590 | 580 | 460 | 460 | 330 |
| | HS [JIS-A] | 66 | 70 | 61 | 63 | 73 | 69 | 76 |
| Ozone degradation test | | 168 h normal | 168 h normal | 168 h normal | 168 h normal | 168 h normal | 168 h normal | 168 h normal |

| | | Ex. 40 | Ex. 41 | Ex. 42 | Ex. 43 | Ex. 44 | Ex. 45 |
|---|---|---|---|---|---|---|---|
| | NBR.PVC | i | j | l | m | o | p |
| Ordinary properties | TB [Mpa] | 13.7 | 12.9 | 14.7 | 11.6 | 15.6 | 12.4 |
| | EB [%] | 500 | 540 | 480 | 330 | 410 | 560 |
| | HS [JIS-A] | 65 | 60 | 70 | 75 | 71 | 62 |
| Ozone degradation test | | 168 h normal | 168 h normal | 168 h normal | 168 h normal | 168 h normal | 168 h normal |

| | | Ex. 46 | Ex. 47 | Ex. 48 | CEx. 17 | CEx. 18 | CEx. 19 |
|---|---|---|---|---|---|---|---|
| | NBR.PVC | q | v | x | n | r | t |
| Ordinary properties | TB [Mpa] | 13.5 | 15 | 11.3 | 10.1 | 13.9 | 12.1 |
| | EB [%] | 510 | 470 | 400 | 250 | 500 | 590 |
| | HS [JIS-A] | 64 | 70 | 74 | 80 | 66 | 58 |
| Ozone degradation test | | 168 h normal | 168 h normal | 168 h normal | 48 h B-3 | 72 h A-3 | 72 h B-3 |

Note: Ex—Example, CEx.—Comparative Example

Production of Hoses and Tests Thereof

Hoses having an inner layer formed of FKM and an outer layer formed of NBR.PVC were produced, and the properties thereof were evaluated.

First, FKM was kneaded with an open roll according to the predetermined recipes of A to C in Table 1 as shown in Table 6. Meanwhile, PBR.PVC was kneaded with a Banbury mixer and an open roll according to the predetermined recipe of a to y in Tables 2 and 3 as shown in Table 6. FKM as an inner layer and NBR.PVC as an outer layer were co-extruded with an extruder. In this manner, hoses shown in Examples and Comparative Examples of Table 6 were obtained. These Example numbers and Comparative Example numbers correspond to the numbers in Table 4 according to the combination of the FKM layer and the NBR.PVC layer.

Each of the thus-obtained hoses had an inner diameter of 30 mm, a thickness of the inner layer of 0.5 mm, and a thickness of the outer layer of 3.5 mm. These extruded hoses were steam-vulcanized at 160° C. for 45 minutes with a steam vulcanizer to form vulcanized hoses.

In the test of properties of the vulcanized hoses, first, the peel strength of the inner and outer layers in an ordinary condition was measured according to JIS K 6256. Further, a commercial gasoline was charged into the hose having a length of 300 mm, and both ends thereof were sealed. This hose was aged in an explosion-proof gear oven at 40° for 168 hours, and the peel strength thereof was measured.

Further, the ozone degradation test of the hose was conducted according to the B method of JIS K 6330 4.2.5. The conditions of the ozone degradation test were that the temperature was 40° C., the ozone concentration 50 pphm and the elongation rate 20%.

The test results are shown in Table 6. In Table 6, * indicates "rubber broken". The results in Table 6 were the same as those in Table 4.

2) However, as shown in Comparative Examples 6 to 9 and Comparative Examples 12 to 15 or Comparative Examples of Table 5, when the polymerization degree of PVC is deviated from the range of from 700 to 1,750 and the amount of PVC is deviated from the range of from 15 to 45 parts by weight per 100 parts by weight of NBR.PVC, the adhesion or the resistance to ozone is insufficient. It is identified, though not shown as a data, that when the amount of PVC is less than 15 parts by weight per 100 parts by weight of NBR.PVC, the resistance to ozone of NBR.PVC as the outer layer of the fuel hose becomes unsatisfactory.

3) As shown in Comparative Examples 1 to 3, unless a carboxylic acid DBU salt is incorporated in NBR.PVC, the adhesion state is notably poor. Further, as shown in Comparative Example 9 and Comparative Examples of Table 5, when the amount of this DBU salt exceeds 4 parts by weight, the adhesion is good, but the resistance to ozone is unsatisfactory.

4) As shown in Comparative Example 4, unless the polyol vulcanizing agent is incorporated in FKM (the recipe of FKM is "C" in Table 1), the adhesion is insufficient. Meanwhile, as shown in Examples 17 to 32, when the polyol vulcanizing agent, the organic peroxide and the polyfunctional unsaturated compound are incorporated in FKM, the higher adhesive strength is obtained than in the case of incorporating the polyol vulcanizing agent alone.

5) As shown in Examples 6, 8, 9, 22, 24 and 25, the amount of the plasticizer is preferably 30 parts by weight or less, especially preferably 25 parts by weight or less per 100 parts by weight of NBR.PVC in view of the adhesion. As shown in Comparative Examples 5 and 10, when the amount exceeds 30 parts by weight, the adhesion is insufficient. Further, as is understandable upon comparison between Example 6 and Examples 10, 22 and 26, the use of ADK CIZER RS-107 of an ether ester type as a plasticizer provides the stronger adhesion strength than the use of DOP of a phthalic acid type.

TABLE 6

| | Structure of materials | | Peel strength in ordinary condition | | Peel strength after ageing | | |
|---|---|---|---|---|---|---|---|
| | Inner layer rubber FKM | Outer layer rubber NBR.PVC | Peel strength (N/25 mm) | Adhesion state | Peel strength (N/25 mm) | Adhesion state | Ozone degradation test |
| Ex. 6 | A | g | 122 | Rubber destroyed | 110<* | Rubber destroyed | 168 h normal |
| Ex. 22 | B | g | 130<* | Rubber destroyed | 110<* | Rubber destroyed | 168 h normal |
| Ex. 25 | B | j | 73 | Rubber partially destroyed | 54 | Rubber partially destroyed | 168 h normal |
| Ex. 28 | B | o | 130<* | Rubber destroyed | 110<* | Rubber destroyed | 168 h normal |
| Ex. 29 | B | p | 130<* | Rubber destroyed | 110<* | Rubber destroyed | 168 h normal |
| CEx. 2 | B | a | 15 | Interfacial peeling | 7 | Interfacial peeling | not conducted |
| CEx. 4 | C | g | 55 | Interfacial peeling | 30 | Interfacial peeling | not conducted |
| CEx. 10 | B | k | 50 | Interfacial peeling | 32 | Interfacial peeling | not conducted |

Ex.—Example, CEx.—Comparative Example

From the results in Tables 4 to 6, the following facts 1) to 7) are understood.

1) In all Examples corresponding to the recipes of adhesion by vulcanization in the invention, the adhesion state was "Rubber partially destroyed" or "Rubber destroyed". Thus, the good adhesion state was shown.

6) As shown in Comparative Example 16, when the content of bound acrylonitrile in the acrylonitrile-butadiene rubber in the NBR.PVC blend exceeds 42% by weight, the adhesion is insufficient. It is identified, though not shown as a data, that when the content of bound acrylonitrile is less than 28% by weight, the fuel oil resistance of NBR.PVC as the outer layer of the fuel hose is insufficient.

7) When the metal oxide and the epoxy resin are incorporated in NBR.PVC as shown in Examples 4 and 20 and silica, especially basic silica is incorporated in NBR.PVC as shown in Examples 5, 6, 21 and 22, the stronger adhesion strength is obtained.

Preferred embodiments of the invention are Examples 22, 28, and 29 shown in Table 6.

While the preferred embodiment has been described, variations thereto will occur to those skilled in the art within the scope of the present inventive concepts which are delineated by the following claims.

What is claimed is:

1. A fuel hose having improved interlayer peel strengths and improved ozone resistance as measured in an ozone test using 40° C., 50 pphr ozone and 20% elongation comprising an inner layer formed of a fluororubber and an outer layer formed of a blend of an acrylonitrile-butadiene rubber and polyvinyl chloride and adhered to said inner layer by vulcanization, wherein said polyvinyl chloride in said blend has an average polymerization degree of from 700 to 1,750 and is contained in an amount of from 15 to 45 parts by weight per 100 parts by weight of said blend; a carboxylic acid 1,8-diazabicyclo-(5,4,0)-undecene-7 salt (DBU salt) represented by formula (1)

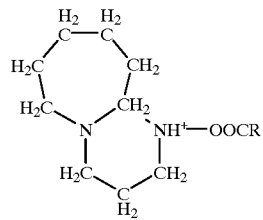

(1)

where R denotes a saturated or unsaturated hydrocarbon radical having a chain structure and/or a cyclic structure, or a derivative thereof, and the structure optionally contains atoms other than carbon atoms and hydrogen atoms, is incorporated in said blend; and a polyol-crosslinking-agent-containing vulcanizing agent is incorporated in said fluororubber.

2. The fuel hose of claim 1, wherein said polyol vulcanizing agent comprises: a polyhydroxy aromatic compound as a crosslinking agent; at least one of an ammonium salt, a phosphonium salt and an iminium salt as a vulcanization accelerator; and at least one of a divalent metal oxide and a divalent metal hydroxide as an acid acceptor.

3. The fuel hose of claim 2, wherein said polyhydroxy aromatic compound comprises between 0.1 and 10 parts by weight per 100 parts by weight of the fluororubber; at least one of said ammonium salt, phosphonium salt and iminium salt comprises between 0.05 and 5 parts by weight per 100 parts by weight of the fluororubber; and at least one of said divalent metal oxide and the divalent metal hydroxide comprises between 1 and 30 parts by weight per 100 parts by weight of the fluororubber.

4. The fuel hose of claim 3, wherein said polyhydroxy aromatic compound comprises between 0.6 and 5 parts by weight per 100 parts by weight of the fluororubber, at least one of said ammonium salt, phosphonium salt and iminium salt comprises between 0.1 and 3 parts by weight per 100 parts by weight of the fluororubber, and at least one of said divalent metal oxide and divalent metal hydroxide comprises between 2 and 10 parts by weight per 100 parts by weight of the fluororubber.

5. The fuel hose of claim 2, wherein a sulfone compound is incorporated as the vulcanization accelerator along with said polyol vulcanizing agent.

6. The fuel hose of claim 1, wherein a plasticizer is incorporated in said blend in an amount of 30 parts by weight or less per 100 parts by weight of said blend.

7. The fuel hose of claim 6, wherein the amount of the plasticizer is 25 parts or less by weight per 100 parts by weight of said blend.

8. The fuel hose of claim 6, wherein the plasticizer comprises an ether ester-type plasticizer represented by formula (2)

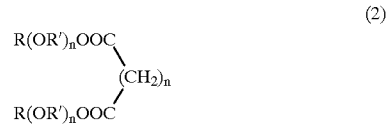

(2)

wherein R denotes an alkyl radical and R' an alkylene radical.

9. The fuel hose of claim 8, wherein said ether ester-type plasticizer is dibutyl carbitol adipate.

10. The fuel hose of claim 1, wherein the content of bound acrylonitrile of the acrylonitrile-butadiene rubber in said blend is between 28 and 42% by weight.

11. The fuel hose of claim 1, wherein the carboxylic acid component of said DBU salt is naphthoic acid, sorbic acid or derivative thereof.

12. The fuel hose of claim 1, wherein said DBU salt comprises between 0.1 and 4 parts by weight per 100 parts by weight of the blend.

13. The fuel hose of claim 12, wherein said DBU salt comprises between 0.5 and 3 parts by weight per 100 parts by weight of the blend.

14. The fuel hose of claim 1, wherein an organic peroxide and a polyfunctional unsaturated compound are further incorporated in said fluororubber.

15. The fuel hose of claim 14, wherein said organic peroxide comprises between 0.05 and 5 parts by weight per 100 parts by weight of the fluororubber, and said polyfunctional unsaturated compound comprises between 0.01 and 10 parts by weight per 100 parts by weight of the fluororubber.

16. The fuel hose of claim 1, wherein a metal oxide and an epoxy resin are incorporated in said blend.

17. The fuel hose of claim 16, wherein said metal oxide comprises between 1 and 20 parts by weight per 100 parts by weight of the blend, and said epoxy resin comprises 15 parts by weight or less per 100 parts by weight of the blend.

18. The fuel hose of claim 1, wherein silica is incorporated in said blend.

19. The fuel hose of claim 18, wherein said silica comprises between 5 and 50 parts by weight per 100 parts by weight of the blend.

20. The fuel hose of claim 18, wherein said silica is basic silica.

* * * * *

UNITED STATES PATENT AND TRADEMARK OFFICE
CERTIFICATE OF CORRECTION

PATENT NO.   : 6,340,511 B1
DATED        : January 22, 2002
INVENTOR(S)  : Shinobu Kanbe et al.

It is certified that error appears in the above-identified patent and that said Letters Patent is hereby corrected as shown below:

Column 13,
Line 15, "strengths" should read -- strength --;
Line 17, "pphr" should read -- pphm --.

Signed and Sealed this

Tenth Day of September, 2002

Attest:

Attesting Officer

JAMES E. ROGAN
Director of the United States Patent and Trademark Office